United States Patent
Ledieu

(10) Patent No.: US 12,191,718 B2
(45) Date of Patent: Jan. 7, 2025

(54) ROTOR FOR AN ELECTRIC MOTOR PROVIDED WITH SENSORS

(71) Applicant: NOVARES FRANCE, Clamart (FR)

(72) Inventor: Cédric Ledieu, Mont Saint Eloi (FR)

(73) Assignee: NOVARES FRANCE, Clamart (FR)

( * ) Notice: Subject to any disclaimer, the term of this patent is extended or adjusted under 35 U.S.C. 154(b) by 125 days.

(21) Appl. No.: 17/795,144

(22) PCT Filed: Feb. 4, 2021

(86) PCT No.: PCT/FR2021/050204
§ 371 (c)(1),
(2) Date: Jul. 25, 2022

(87) PCT Pub. No.: WO2021/160954
PCT Pub. Date: Aug. 19, 2021

(65) Prior Publication Data
US 2023/0062483 A1   Mar. 2, 2023

(30) Foreign Application Priority Data

Feb. 13, 2020 (FR) .................................. 20/01433

(51) Int. Cl.
*H02K 11/25* (2016.01)
*H02K 1/276* (2022.01)
*H02K 21/14* (2006.01)

(52) U.S. Cl.
CPC .......... *H02K 11/25* (2016.01); *H02K 1/2773* (2013.01); *H02K 21/14* (2013.01)

(58) Field of Classification Search
CPC ....... H02K 11/25; H02K 1/2773; H02K 21/14
See application file for complete search history.

(56) References Cited

U.S. PATENT DOCUMENTS

| 10,873,248 B2 * | 12/2020 | Dib ......................... H02K 7/08 |
| 2011/0273121 A1 | 11/2011 | Wan et al. |
| 2012/0200188 A1 | 8/2012 | Sano et al. |

FOREIGN PATENT DOCUMENTS

| CN | 108134485 A | * | 6/2019 | ............. F16C 19/06 |
| DE | 202018103227 U1 | | 9/2019 | |
| JP | 2002369451 A | * | 12/2002 | |
| WO | 2013047979 A1 | | 4/2013 | |

OTHER PUBLICATIONS

JP-2002369451-A_translate (Year: 2002).*
International Search Report issued Apr. 26, 2021 re: Application No. PCT/FR2021/050204, pp. 1-2, citing: U.S. Pat. No. 20110273121 A, U.S. Pat. No. 20120200188 A1, DE 202018103227 U1, WO 2013047979 A1.

* cited by examiner

*Primary Examiner* — Tulsidas C Patel
*Assistant Examiner* — Mohammed Ahmed Qureshi
(74) *Attorney, Agent, or Firm* — CANTOR COLBURN LLP

(57) ABSTRACT

A rotor for an electric motor includes a rotor shaft rotatably mounted about an axis; and a lamination stack mounted coaxially on the rotor shaft. The lamination stack includes inner cavities; permanent magnets housed inside the inner cavities of the lamination stack; and a front flange and a rear flange mounted coaxially on the rotor shaft and arranged axially on either side of the lamination stack. At least one amongst the front flange and the rear flanges is equipped with at least one sensor.

8 Claims, 3 Drawing Sheets

ROTOR FOR AN ELECTRIC MOTOR PROVIDED WITH SENSORS

TECHNICAL FIELD

The disclosure concerns a rotor for an electric motor. The disclosure also concerns an electric motor comprising such a rotor.

BACKGROUND

In general, current electric motors include a rotor secured to a shaft and a stator which surrounds the rotor. The stator is mounted in a casing which includes bearings for the rotational mounting of the shaft. The rotor includes a body formed by a lamination bundle or claw pole held in the form of a stack by means of a suitable fastening system. The body of the rotor includes inner cavities housing permanent magnets. The stator includes a body consisting of a lamination bundle forming a crown, the internal face of which is provided with teeth delimiting two by two a plurality of slots open towards the inside of the stator body and intended to receive phase windings. These phase windings pass through the slots of the stator body and form winding heads projecting on either side from the stator body. The phase windings may for example consist of a plurality of U-shaped conductor segments, the free ends of two adjacent segments being connected together by welding.

In the rotor, the lamination stack is clamped axially between a front flange and a rear flange which are mounted coaxially with the shaft. Each flange generally has the shape of a disc extending in a radial plane perpendicular to the axis of the shaft. Each flange has a central orifice for the coaxial mounting on the shaft and several through holes intended to receive fastening screws passing axially through the entire lamination stack, said screws being secured to the flanges by means of bolts. The front and rear flanges are generally formed from a non-magnetic, heat-conducting material, for example a metal.

As the electric motors are likely to be damaged or even destroyed in the event of overheating of the rotor, it is generally necessary to equip electric motors with temperature sensors capable of detecting the temperature within the rotor. Due to the difficulty of installing them on the rotor itself, these sensors are generally fastened on the stator. This position relatively far from the main heat source is however not satisfactory because it does not provide a sufficiently reliable measurement of the temperature prevailing within the rotor.

SUMMARY

Hence, the disclosure provides a solution to the problem of temperature measurement within an electric motor rotor as previously described.

To this end, the disclosure concerns a rotor for an electric motor comprising:
- a rotor shaft rotatably mounted about an axis;
- a lamination stack mounted coaxially on the rotor shaft, said lamination stack comprising a plurality of inner cavities;
- a plurality of permanent magnets housed inside the inner cavities of the lamination stack;
- a front flange and a rear flange mounted coaxially on the rotor shaft and arranged axially on either side of the lamination stack;

wherein at least one amongst the front and rear flanges is equipped with at least one sensor.

Configured in this manner, the rotor of the disclosure will make it possible to carry out measurements of physical parameters within the rotor itself. These measurements will therefore be more reliable and will make it possible, in the case of a measurement of the temperature of the rotor, to detect sufficiently early an overheating of said rotor and, as a result, to limit the risk of possible damage to the motor resulting from such overheating.

According to other features, the rotor of the disclosure includes one or several of the following optional features considered alone or in all possible combinations:
- said at least one flange equipped with at least one sensor is formed from a plastic material.
- said at least one sensor is fastened on the flange by a fastening method selected from overmolding, gluing and clipping.
- one amongst the front and rear flanges is formed from a plastic material and the other amongst said front and rear flanges is formed of metal, the density of the plastic flange being substantially equal to the density of the metal flange.
- the metal flange is formed of aluminium.
- said at least one sensor is a thermal measurement sensor.
- said thermal measurement sensor is positioned on the flange so as to be in contact with a permanent magnet.
- said at least one sensor is a position sensor.
- said at least one flange comprises at least two sensors, said sensors being disposed symmetrically with respect to the axis of the rotor shaft.

According to another aspect, the disclosure concerns an electric motor comprising a rotor as previously defined.

BRIEF DESCRIPTION OF THE DRAWINGS

The disclosure will be better understood upon reading the non-limiting following description, made with reference to the appended figures.

DETAILED DESCRIPTION OF THE DRAWINGS

Figure 1:
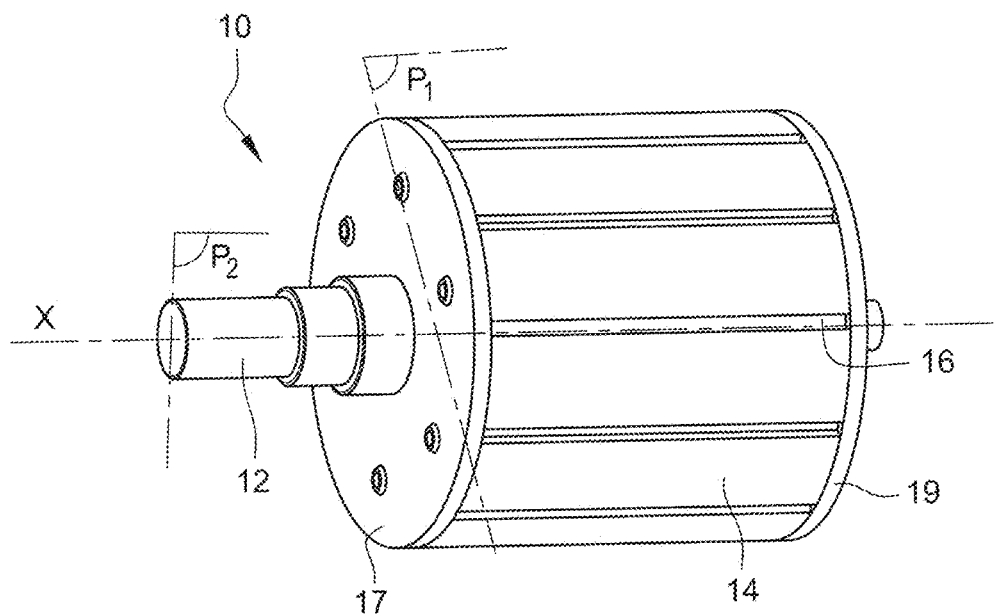
FIG. 1 is a perspective view of a rotor according to a particular embodiment of the disclosure.
Figure 2:
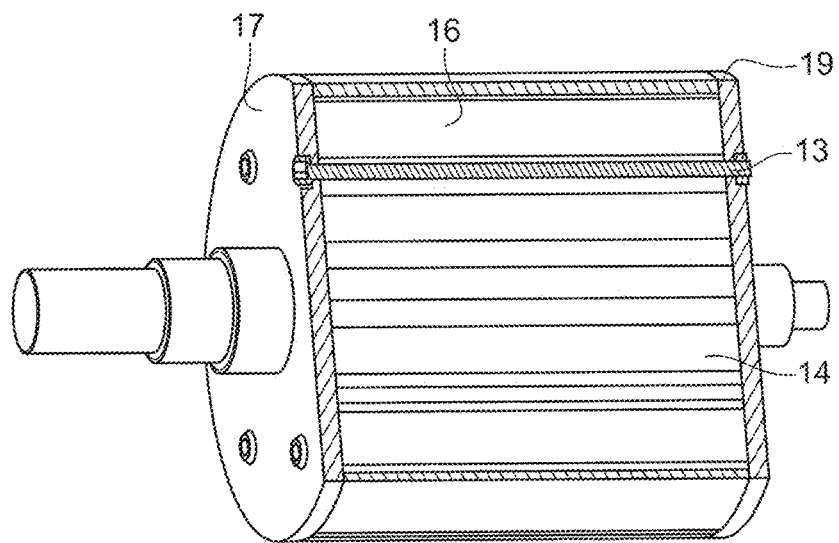
FIG. 2 is a sectional view of the rotor of FIG. 1 along the section plane P1.
Figure 3:
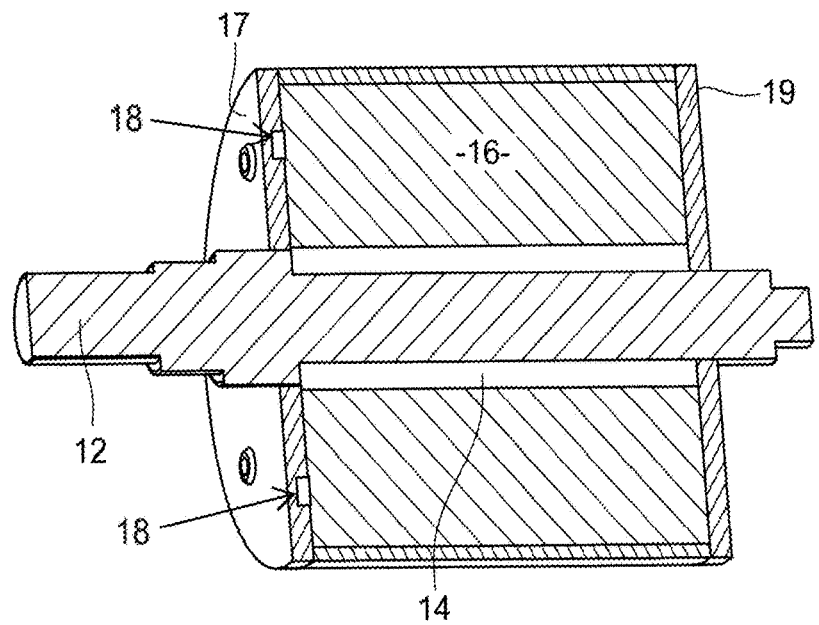
FIG. 3 is a sectional view of the rotor of FIG. 1 along the section plane P2.

FIGS. 1 to 4 represent a rotor 10 comprising a body formed by a lamination stack 14 made of a ferromagnetic material, in particular of steel, as well as a plurality of permanent magnets 16 intended to be housed in a plurality of inner cavities 15 formed inside the lamination stack 14, each inner cavity 15 housing a permanent magnet 16. The lamination stack 14 is mounted coaxially on a shaft 12 rotatably mounted about an axis X. The shaft 12 may be fitted by force inside a central opening of the lamination stack 14 so as to bind in rotation the body of the rotor with the shaft 12.

The lamination stack 14 is formed by an axial stacking of laminations which extend in a radial plane perpendicular to the axis X of the shaft 12. A plurality of fastening holes 11 are made in the lamination stack 14 to allow the passage of fastening bolts 13 of the lamination stack. These fastening holes 11 are through holes such that it is possible to push a bolt 13 inside each hole 11. A first end of the bolts 13 bears against the outer face of a front end flange 17, while the other end of the bolts bears against the outer face of a rear end flange 19. Thus, the lamination stack 14 is clamped axially between the front end flange 17 and the rear end flange 19. These flanges 17, 19 make it possible to ensure a balancing of the rotor 10 while allowing a good maintenance of the magnets 16 inside their cavity 15. Balancing may be carried out by adding or removing material. The removal of material may be carried out by machining, while the addition of material may be carried out by implanting elements in openings provided for this purpose and distributed along the circumference of the flange 17, 19.

Figure 4:
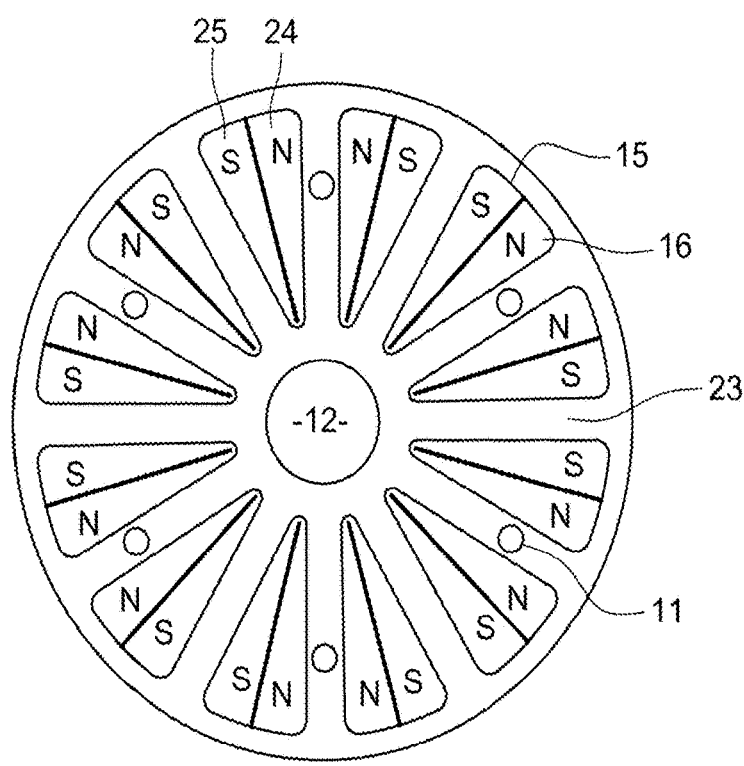
FIG. 4 is a cross-sectional view of the rotor of FIG. 1.

As illustrated in FIG. 4, which is a sectional view of the rotor 10 along a section plane orthogonal to the X axis, the cavities 15 extend in a radial direction relative to the X axis and are axial through cavities. They have a substantially triangular section and are evenly distributed around the X axis.

Two directly adjacent cavities 15 are separated by a radial segment 23 of the lamination stack 14 such that the body of the rotor includes an alternation of cavities 15 and segments 23 when following a circumference of the rotor 10. Each cavity 15 houses a single magnet 16. The permanent magnets 16 may be made of rare earth or ferrite depending on the applications and the desired power of the electric motor. The magnets 16 are orthoradially magnetized, that is to say that the two end faces 24, 25 of each magnet 16 which are adjacent to each other in the orthoradial direction are magnetized so as to be able to generate a magnetic flux following an orthoradial orientation with respect to the X axis. Among these end faces 24, 25, it is necessary to distinguish the face 24 corresponding to the North pole of the magnet 16, represented by the letter "N" in FIG. 4, and the face 25 corresponding to the South pole of the magnet 16, represented by the letter "S" in FIG. 4. The magnets 16 located in two consecutive cavities 15 are of alternating polarities. Arranged in this manner, the magnets 16 generate in the lamination stack 14 a magnetic flux oriented radially and directed towards the outer periphery of the body of the rotor.

Figure 5:
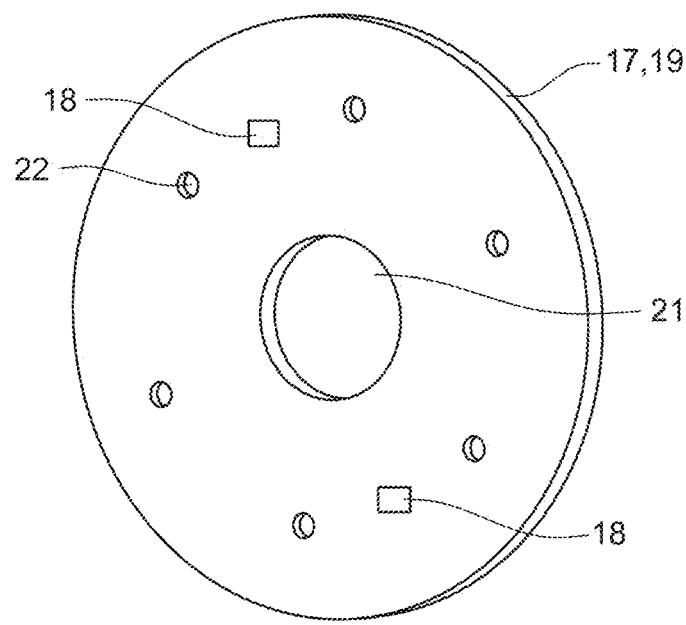
FIG. 5 is a perspective view of one of the end flanges of the rotor of FIG. 1.

Referring to FIG. 5, there is represented one of the end flanges 17 or 19 of the rotor 10. This flange 17 or 19 has the shape of a disc extending in a radial plane perpendicular to the axis X of the shaft 12. The flange 17 or 19 includes a central orifice 21 for the coaxial mounting on the shaft 12 and several through holes 22 intended to receive the fastening bolts 13 passing axially through the assembly of the lamination stack 14. This flange 17 or 19 is further equipped with two sensors 18 disposed diametrically opposite with respect to the axis X of the shaft 12. These sensors 18 may for example be position sensors or temperature sensors. In the latter case, the sensors 18 are advantageously positioned on the inner face of the flange 17 or 19 so as to be each in direct contact with one of the permanent magnets 16 of the rotor 10. The temperature measurement is therefore more reliable and makes it possible to detect more quickly if the rotor 10 is overheated. In order to facilitate the fastening of the sensors 18 on the flange 17 or 19, it is advantageous to form the flange 17 or 19 by molding a plastic material. The sensors 18 may thus be overmolded with the material constituting the flange 17 or 19. In other embodiments of the disclosure, the sensors 18 may also be fastened on the flange 17 or 19 by gluing or clipping. The other flange 17 or 19 will be formed in this case from a metallic material, for example from aluminum. In order to allow good balancing of the rotor, the density of the plastic flange is substantially equal to the density of the metal flange.

Figure 6:
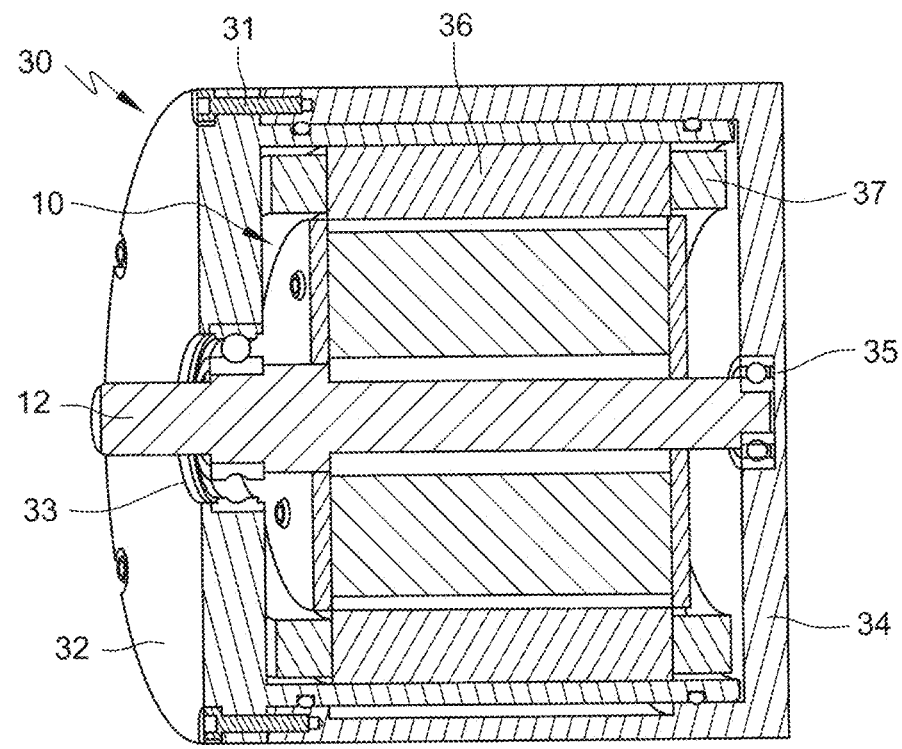
FIG. 6 is an axial sectional view of an electric motor incorporating the rotor represented in FIG. 1.

Referring to FIG. 6, there is represented an electric motor 30 implementing the rotor 10 of FIG. 1. This electric motor 30 comprises in particular a casing housing in two portions the rotor 10 secured in rotation to the shaft 12 and an annular stator 36 which surrounds the rotor 10 coaxially to the shaft 12. The casing includes in particular of a front bearing 32 and a rear bearing 34 which are connected to each other by means of fastening screws 31. The bearings 32, 34 are hollow in shape and each centrally carry a ball bearing 33 and 35 respectively for rotatably mounting the shaft 32. As illustrated in FIG. 6, winding heads 37 project axially on either side from the stator body 36 and are housed in the intermediate space separating the stator 36 from the respective bearings 32, 34.

Of course, the disclosure is not limited to the configuration of the disclosure as previously described. In particular, in another configuration of the disclosure, the flange 17 or 19 represented in FIG. 5 may only be equipped with a single sensor or, on the contrary, may include more than two sensors. In this case, the sensors will advantageously be disposed symmetrically with respect to the axis of the shaft so as to avoid an imbalance of said flange. In another configuration of the disclosure, the two flanges 17 and 19 could be equipped with sensors.

The invention claimed is:

1. A rotor for an electric motor comprising:
a rotor shaft rotatably mounted about an axis;
a lamination stack mounted coaxially on the rotor shaft, said lamination stack comprising a plurality of inner cavities;
a plurality of permanent magnets housed inside the inner cavities of the lamination stack;
a front flange and a rear flange mounted coaxially on the rotor shaft and arranged axially on either side of the lamination stack;
wherein at least one of the front and rear flanges is equipped with at least one sensor, and
wherein said at least one sensor is a thermal measurement sensor, the thermal measurement sensor being positioned on at least one of the front and rear flanges to be in contact with a permanent magnet.

2. The rotor according to claim 1, wherein said at least one of the front and rear flanges is equipped with at least one sensor is formed from a plastic material.

3. The rotor according to claim 2, wherein said at least one sensor is fastened to the at least one of the front and rear flanges by a fastening method selected from overmolding, gluing and clipping.

4. The rotor according to claim 1, wherein one of the front and rear flanges is formed from a plastic material and the other of said front and rear flanges is formed of metal, the density of the plastic flange being substantially equal to the density of the metal flange.

5. The rotor according to claim 4, wherein the metal flange is formed of aluminum.

6. The rotor according to claim 1, wherein said at least one sensor is a position sensor.

7. The rotor according to claim 1, wherein at least one of the front and rear flanges comprises at least two sensors, said sensors being disposed symmetrically with respect to the axis of the rotor shaft.

8. An electric motor comprising a rotor according to claim 1.

* * * * *